United States Patent
Tugend et al.

(10) Patent No.: US 6,840,719 B2
(45) Date of Patent: Jan. 11, 2005

(54) BORING HEAD

(75) Inventors: Raymond Tugend, Uberach (FR); Alain Freyermuth, Pfaffenhoffen (FR)

(73) Assignee: E.P.B., Bouxwiller (FR)

( * ) Notice: Subject to any disclaimer, the term of this patent is extended or adjusted under 35 U.S.C. 154(b) by 280 days.

(21) Appl. No.: 10/149,697

(22) PCT Filed: Sep. 10, 2001

(86) PCT No.: PCT/FR01/02804
§ 371 (c)(1),
(2), (4) Date: Jun. 14, 2002

(87) PCT Pub. No.: WO02/20203
PCT Pub. Date: Mar. 14, 2002

(65) Prior Publication Data
US 2003/0002939 A1 Jan. 2, 2003

(30) Foreign Application Priority Data
Sep. 11, 2000 (FR) .............................. 00 11531

(51) Int. Cl.[7] .............................................. B23B 29/03
(52) U.S. Cl. ...................... 408/181; 408/153; 408/185
(58) Field of Search ................................ 408/153, 181, 408/182, 183, 185

(56) References Cited

U.S. PATENT DOCUMENTS

| | | | | |
|---|---|---|---|---|
| 981,392 A | * | 1/1911 | Dette | 408/182 |
| 1,046,740 A | * | 12/1912 | Davis | 408/179 |
| 1,824,543 A | * | 9/1931 | Hartwell | 408/183 |
| 3,730,636 A | * | 5/1973 | Mizoguchi | 408/169 |
| 4,006,995 A | * | 2/1977 | Gruner | 408/157 |
| 4,405,268 A | * | 9/1983 | Abe | 408/182 |
| 4,500,233 A | | 2/1985 | Dehn | |
| 4,784,536 A | * | 11/1988 | Pfalzgraf | 408/181 |
| 4,861,202 A | * | 8/1989 | Fendler | 408/181 |

FOREIGN PATENT DOCUMENTS

| | | | | |
|---|---|---|---|---|
| DD | 118 542 | | 3/1976 | |
| DE | 3633560 | * | 4/1988 | B23B/29/03 |
| DE | 3811775 | * | 12/1988 | B23B/29/03 |
| DE | 3916565 | * | 11/1990 | B23B/29/03 |
| FR | 2 117 330 | | 7/1972 | |

* cited by examiner

Primary Examiner—Daniel W. Howell
(74) Attorney, Agent, or Firm—Young & Thompson

(57) ABSTRACT

A boring head, essentially consists of a body (1) provided with a housing (2) for receiving two tool-holders (3), capable of being radially driven via a moving device (4), and of element (5) for locking the tool-holders (3) in operational position. The boring head is characterized in that the element (5) locking the tool-holders (3) in operational position consists of a single clamping device simultaneously acting on the two tool-holders (3) and on the body (1). The invention is more particularly applicable in the field of machine-tool accessories, in particular digitally controlled machines, of machining plants and adaptable cells and workshops.

16 Claims, 3 Drawing Sheets

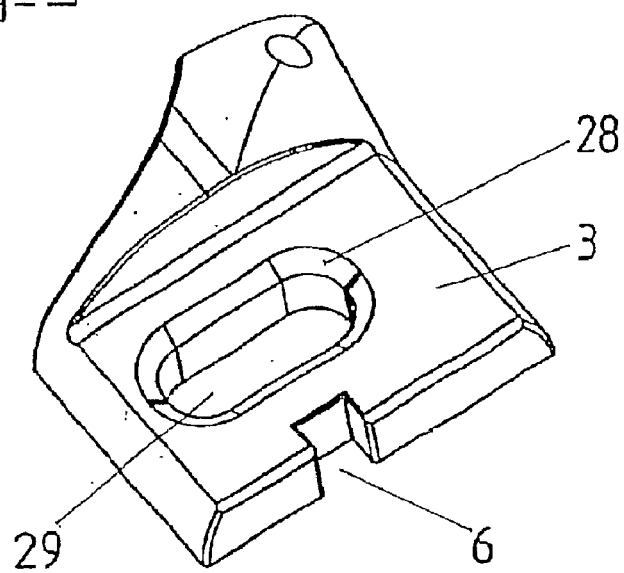
Fig_5
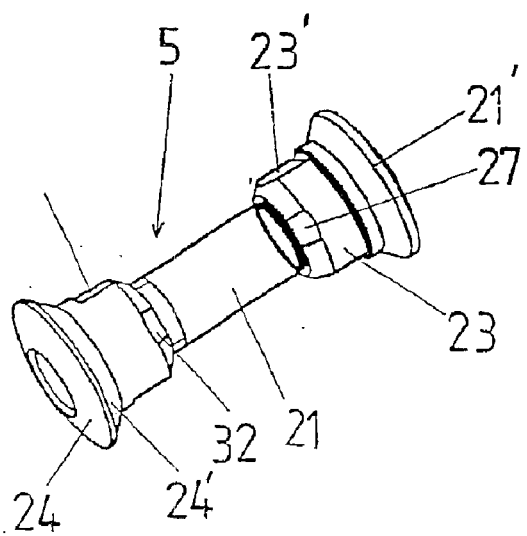
Fig_6

BORING HEAD

BACKGROUND OF THE INVENTION

The present invention relates to the field of machine tool accessories, in particular digitally controlled machines, machining centers and adaptable units and workshops and has for its object a boring head adapted to enlarge holes having very rigorous geometric characteristics, by means of a range of bit carriers of the interchangeable slide type.

There exist at present different devices permitting adjusting the selected diameter. However, in these devices, the locking of the assembly elements cannot be carried out by a single gripping means and generally requires several gripping means. Moreover, in devices provided with two bit carriers or slides, the adjustment cannot be carried out as desired from either side and it is impossible to carry out a simultaneous or independent adjustment of the two slides.

SUMMARY OF THE INVENTION

The present invention has for its object to overcome these drawbacks by providing a boring head permitting centralized blocking of the bit carriers or slides and individual or simultaneous adjustment of said slides.

For reasons of simplicity and clarity of the description, the bit carriers will be called slides. To this end, the boring head, which is constituted by a body provided with a recess for the reception of two slides, that can be driven radially by means of a movement device, and by means for locking in service position the slides, is characterized in that the means for locking in service position of the slides is constituted by a single gripping device acting simultaneously on the slides and on the body.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 5 is a plan view of a slide, and

FIG. 6 is a perspective view of the single locking means.

DESCRIPTION OF THE PREFERRED EMBODIMENTS

Figure 1:
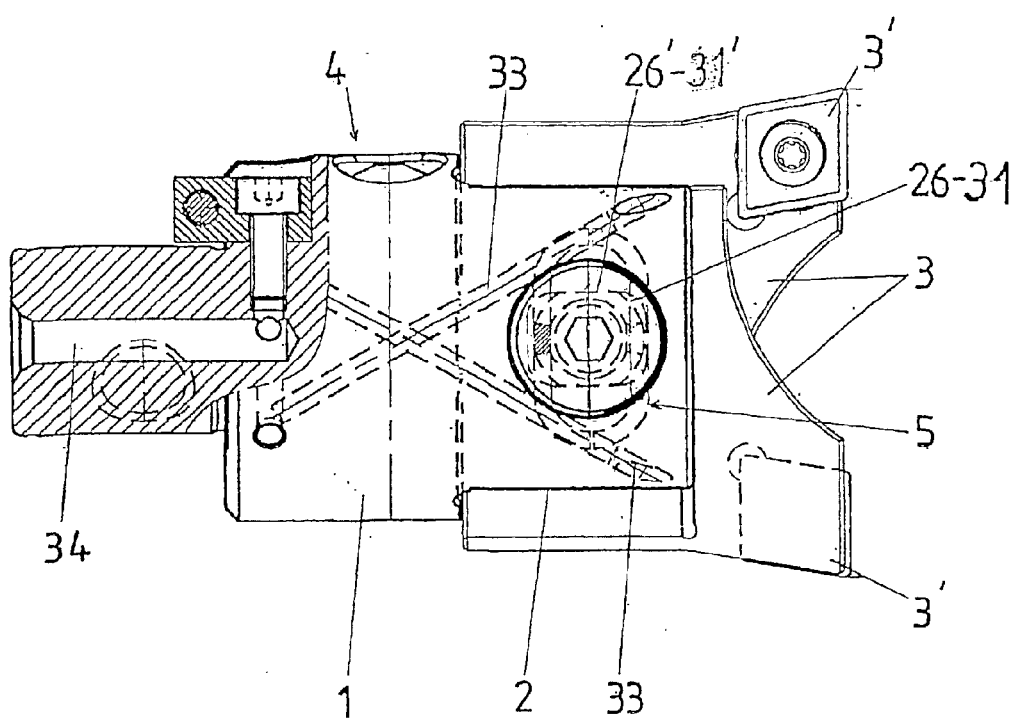
FIG. 1 is a side elevational and partial cross-sectional view of a boring head according to the invention.
Figure 2:
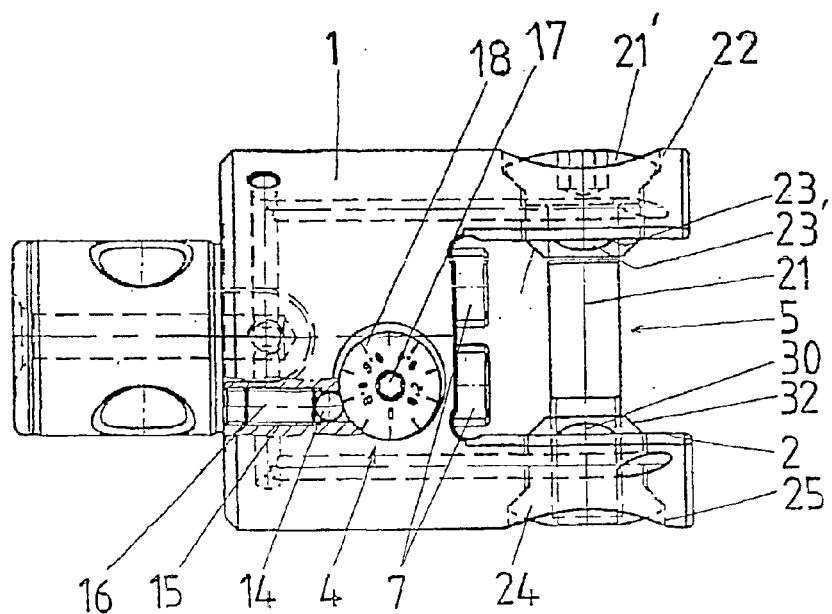
FIG. 2 is a side elevational view of the boring head of FIG. 1, turned 90° about its longitudinal axis, the slides being removed.
Figure 3:
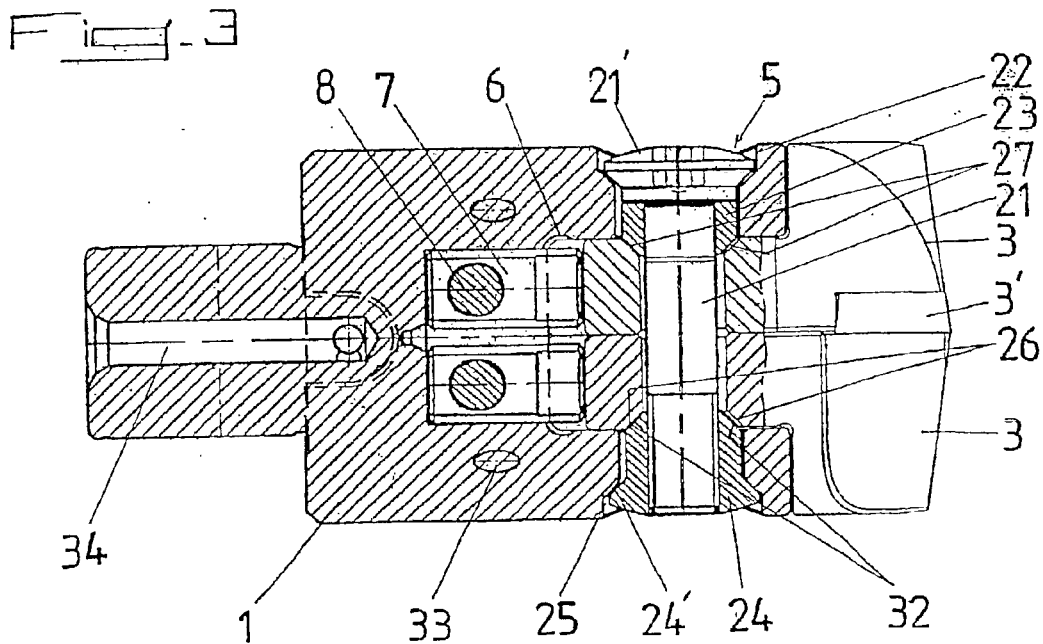
FIG. 3 is a view analogous to that of FIG. 2, partially in cross-section, the slides being mounted.

FIGS. 1–3 of the accompanying drawings show, by way of example, a boring head, which is essentially constituted by a body 1 provided with a recess 2 for the reception of two slides 3, that can be driven radially by means of a movement device 4, and by a means 5 for blocking the slides 3 in service position.

According to the invention, the means 5 for blocking the slides 3 in service position is constituted by a single gripping device acting simultaneously on the two slides 3 and on the body 1.

The recess 2 for reception of the slides 3 is present, in known manner, in the form of a prismatic notch extending perpendicularly to the longitudinal axis of the body 1 in the front end of this latter.

The slides 3 are in the form of bit carriers that are identical or of different heights and are each provided with a machining bit connected by screwing or by raising. The use of slides of different height permits, in the case of machining with the removal of a large thickness of cuttings, an offset of the bit effecting the smallest diameter in front of the bit effecting the larger diameter. These slides 3 are each provided, on the side penetrating to the bottom of the recess 2, a drive groove 6 adapted to coact with the movement device 4 and extending perpendicular to the direction of movement of the slides 3.

According to one characteristic of the invention, the movement device 4 is preferably constituted by a pair of lugs 7 which, on the one hand, each penetrate by their ends into a corresponding drive groove 6 of a slide 3 and, on the other hand, coact, at their other end, with an adjustment screw 8 and with a coupling means 9 for actuating the adjustment screw 8. Thus, by placing in rotation the adjustment screw 8, the latter produces a movement of the corresponding lug 7 and, because of this, a radial displacement of the slide 3.

The adjustment screws 8 are preferably disposed head to tail parallel to the bottom of the recess 2 of the body 1.

The means 9 for coupling the actuation of the adjustment screws 8 is preferably constituted by a pair of pinions 10 mounted respectively one near the head 8' of one of the screws, and the other near the free end of the other screw 8. Preferably, the pinion 10 mounted near the free end of one of the screws 8 is fixed on this latter by means of an expansible device constituted by a gripping screw 11 with a truncated conical head and by the slotted end 8" of the screw 8. The provision of such an expansible device permits, on the one hand, by gripping the screw 11 with a truncated conical head, a blocking in position of the pinion 10 on the end 8" of the screw 8, following the expansion of said end 8" and, on the other hand, the possibility of a sliding mounting of the pinion 10 on the end 8", by partially unlocking the screw 11 with a truncated head. In the first case, the actuation of one of the screws 8 could have the result of synchronous driving of the other screw 8 and hence a simultaneous movement of the two slides 3, whilst in the second case, each slide 3 could be moved independently by actuation of the corresponding adjustment screw 8, the pinion 10 mounted on the end 8" of one of the screws being thus in free rotation on this end. This pinion 10 could then undergo a drive having no effect on the screw 8 on which it is mounted or statically resting when the screw on which it is mounted is actuated.

The actuation of the screw with a truncated conical head 11 can be carried out through a hole 11' in the body 1 aligned with the axis of the corresponding screw 8.

The heads of the screws 8' of the adjustment screws 8 are each provided with a positioning and holding means in translation, in the form of a lateral abutment without play, constituted by an assembly of throats 12 and 13 provided respectively in the screw head 8' and in the body 1 and by balls 14. The mounting of the balls 14 in such a lateral abutment is carried out in known manner by means of a radial or tangential hole 15 (FIG. 2) provided in a screw-threaded plug 16. Such a mounting permits positioning and holding of the screws 8 without play, with the possibility of adjusting the hardness of operation by more or less pronounced gripping of the screw-threaded plug 16.

In a known manner, the screw heads 8' of the locking screws 8 are provided, on the one hand, with means for operating by a key 17 and, on the other hand, a scale 18. There is thus the possibility of verifying immediately the quantity of movement of the corresponding slides 3 carried out during actuation of the screw 8.

Moreover, the two screws 8 being identical, and a synchronous drive of them being possible, the movement device 4 is a bilateral actuating device, which further facilitates the adjustment movements.

The screws 8 coact with slides 3 by means of lugs 7, the recesses of the screws 8 and pinions 10 which they are provided with are connected to the recess 2 of the body 1 by means of a through recess 19. As a result, impurities or waste from machining can if desired pass through the recess 19 into the recesses of the screws 8. To avoid penetration of such impurities or waste between the teeth of the pinions 10, the corresponding portions of said recesses are closed by means of a plate 20 connected against the corresponding surface of the pinion 10 mounted at the free end of one of the screws 8.

Figure 4:
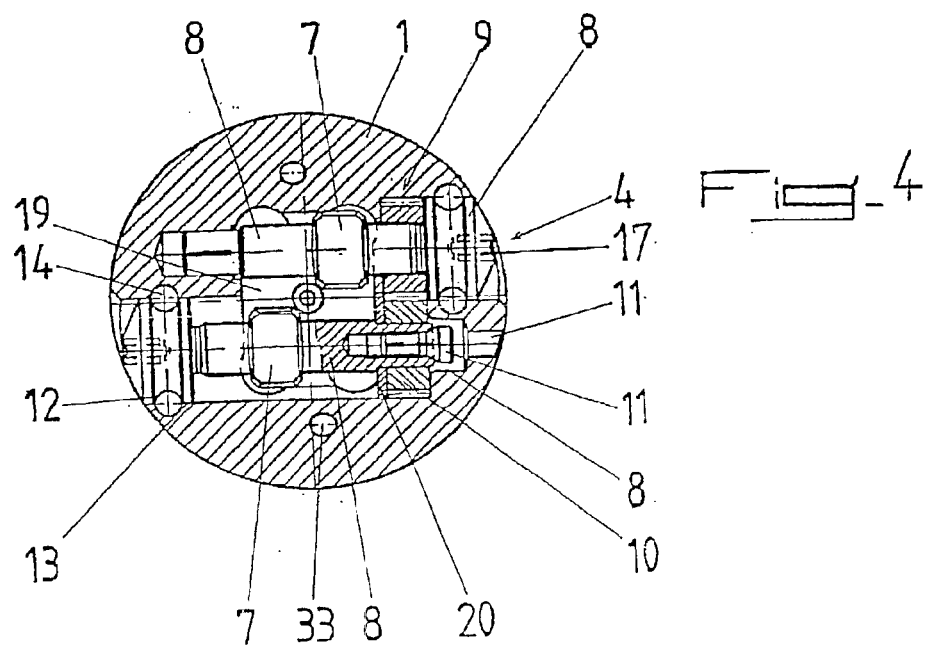
FIG. 4 is a cross-sectional view on the line A—A of FIG. 2.

As will be seen more particularly from FIG. 4 of the accompanying drawings, the mounting of the plate 20 can for example be carried out against the pinion 10 mounted at the free end of the screw 8, by arrangement of said plate 20 between a shoulder of the screw 8 and said pinion 10. Such a mounting of the plate does not require further description and is well within the scope of those skilled in the art.

The single locking device acting simultaneously on the two slides 3 and on the body 1, forming the means 5 for blocking in service position of said slides 3, which is shown more particularly in FIGS. 1 to 3 and 6 of the accompanying drawings, is constituted by a screw 21 passing perpendicularly through the recess 2 and the slides 3 and provided with a head 21' with a conical periphery coacting with counterbore 22 on one of the portions of the body 1 delimiting the recess 2, by a locking ring 23 bearing below the head 21' of the screw 21 and coacting with its opposite end with one of the slides 3, and by a nut 24 with a conical periphery coacting, on the one hand, with a counterbore 25 on the other of the portions of the body 1 delimiting the recess 2 and, on the other hand, at its end opposite to the counterbore 25 with the other slide 3.

According to one characteristic of the invention, the locking ring 23 is mounted freely in rotation on the screw 21 and is provided with two diametrically opposed flats 23' adapted to coact with surfaces 26' of a passage hole 26 of oblong cross-section, whose length slightly exceeds the diameter of the ring 23.

Moreover, according to another characteristic of the invention, the locking ring 23 is provided, at its end opposite to the screw head 21', with two inclined flats 27 offset by 90° relative to the flats 23' and coacting with chamfers 28 of the same inclination provided on the corresponding surface of the corresponding slide 3 at the periphery of an oblong hole 29 for passage of the screw 21.

The nut 24 is provided with a conical periphery 24' coacting with the bottom of the counterbore 25 and comprises, below said conical periphery 24', diametrically opposed flats 30 adapted to coact with surfaces 31' of a passage hole 31 of oblong cross-section, whose length slightly exceeds the diameter of the nut 24 below the conical periphery 24'.

Moreover, the nut 24 is provided, at its end opposite the conical periphery 24', with two inclined flats 32 offset 90° relative to the flats 30 and coacting with chamfers 28 of the same inclination provided on the corresponding surface of the corresponding slide 3 at the periphery of an oblong hole 29 for passage of the screw 21.

The oblong hole 29 of the slides 3 has a width greater than the diameter of the screw 21, so as to permit clearance of the slides 3 relative to the screw 21, along the longitudinal axis of the body 1.

By locking the nut 24 on the screw 21 by means of a coacting tool, for example with the head 21' of the screw 21, the nut 24 and the locking ring 22 are pressed into the chamfers 28 provided at the periphery of the oblong holes 29 of the slide 3 and lock these latter one against the other by their adjacent surfaces. In this same movement together of the nut 24 and the ring 22, the coaction of the inclined flats 27 and 32 of the ring 22 and the nut 24 with one of the chamfers 28 on a same side of the oblong holes 29, has the effect of giving rise to simultaneous movement of the slides 3 tending to press them, on the one hand, against the forward surface of the body 1, and, on the other hand, preferably against the bottom of the recess 2. As a result, the slides 3 are perfectly locked in service position and held against any risk of pivoting on the body 1 by application of the corresponding surfaces.

According to another characteristic of the invention, the counterbores 22 and 25 for receiving the head of the screw 21' and the nut 24, have an outwardly curved bottom chamfer adapted to coact with the corresponding conical peripheries of the head of the screw 21' and 24' of the nut 24.

The provision of contact surfaces with a conical periphery between the screw head 21' and the counterbore 22, as well as between the nut 24 and the counterbore 25, permits guaranteeing an optimum application of the locking force for the locking of the slides 3, whilst ensuring a degree of freedom in the case of slight misalignment between the axes of the oblong holes 29 of the slides 3. Moreover, the construction itself of the single locking device acting simultaneously on the two slides 3 and on the body 1, forming the means 5 for blocking in service position said slides 3 and that of the counterbores 22 and 25 permit as desired the mounting of this means 5 from one or the other side of the front portion of the body 1.

According to another characteristic of the invention, and as shown more particularly in FIG. 1 to 3 of the accompanying drawings, the body 1 is provided moreover with a central lubricating device constituted by channels 33 bored in said body 1 and opening at the front end of this latter, near the cutting bits 3' of the slides 3, these said channels 33 being connected, at the rear end of the body 1, to a central supply channel 34.

Thus, it is possible to bring cutting lubricant to the immediate vicinity of the cutting tools, without having any contact between said lubricant and the mechanical members for adjusting and blocking the boring head.

Thanks to the invention, it is possible to provide a boring head permitting the use of identical slides or of different sizes for offset working and guaranteeing an adjustment and particularly precise and reliable blocking of said slides. Moreover, because of the provision of simultaneous bilateral adjustment and blocking by means of a single device, the use of such a boring head is particularly simple and rapid and the corresponding costs are accordingly reduced.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed:

1. A boring head, comprising:

a body with a recess having two slides therein, said two slides being driven radially by a movement device;

a gripping device acting simultaneously on said two slides and on said body for locking in a service position said two slides;

each of said two slides being provided with a drive groove adapted to coact with said movement device and extending perpendicular to a direction of movement of said two slides; and said movement device comprising a pair of lugs that each penetrate into a corresponding said drive groove and that each coact with a respective adjustment screw, said adjustment screws being disposed head to tail parallel to a bottom of said recess of said body.

2. The boring head of claim 1, further comprising means for coupling actuation of said adjustment screws.

3. The boring head of claim 2, wherein said means for coupling actuation of said adjustment screws comprises a pair of pinions, one of said pair of pinions being mounted adjacent a head of one of said adjustment screws and the other of said pair of pinions being mounted near a free end of another of said adjustment screws.

4. A boring head, comprising:

a body (1) provided with a recess (2) for reception of two slides (3), that can be driven radially by means of a movement device (4);

means (5) for locking in a service position the slides (3), said means for locking comprising a single gripping device acting simultaneously on the two slides (3) and on the body (1), wherein the single gripping device comprises a screw (21) passing perpendicularly through the recess (2) and the slides (3) and provided with a head (21') with a conical periphery coacting with a counterbore (22) of one of the portions of the body (1) delimiting the recess (2), a gripping ring (23) bearing below the head (21') of the screw (21) and coacting with its opposite end with one of the slides (3) and a nut (24) with a conical periphery coacting on the one hand with a counterbore (25) on the other of the portions of the body (1) and delimiting the recess (2) and, on the other hand, at its end opposite the counterbore (25) with the other slide (3).

5. The boring head of claim 1, wherein said gripping device comprises a first screw passing perpendicularly through said recess and said slides, said first screw having a head with a conical periphery coacting with a first counterbore of a portion of said body delimiting said recess, a gripping ring bearing below said head of said first screw and coacting with one of said slides, and a nut with a conical periphery coacting with a second counterbore on another portion of said body delimiting said recess and with the other of said slides.

6. Boring head according to claim 3, wherein the other of said pair of pinions mounted near the free end of one of said adjustment screws is fixed on this latter by means of an expansible device constituted by a gripping screw with a truncated conical head and by a slotted end of the screw.

7. Boring head according to claim 1, wherein screw heads of the adjustment screws are each provided with a means for positioning and holding in translation in the form of a lateral abutment without play constituted an assembly of throats provided respectively in the screw head and in the body and by balls.

8. Boring head according to claim 3, wherein recesses of the adjustment screws and the pinions belonging to them are connected to the recess of the body by means of a crossing recess.

9. Boring head according to claim 8, wherein the recesses of the screws and the pinions are closed by means of a plate connected against the corresponding surface of the pinion mounted at the free end of one of the screws.

10. Boring head according to claim 4, wherein the body (1) is moreover provided with a central lubricating device constituted by channels (33) bored in said body (1) and opening at the front end of this latter, near cutting bits (3') of the slides (3), these said channels (33) being connected, at the rear end of the body (1), to a central supply channel (34).

11. Boring head according to claim 4, wherein the gripping ring (23) is mounted freely in rotation on the screw (21) and is provide with two diametrically opposed flats (23') adapted to coact with the surfaces (26') of a passage hole (26) of oblong cross-section, whose length slightly exceeds the diameter of the ring (23).

12. Boring head according to claim 4, wherein the gripping ring (23) is provided at its end opposite the screw head (21'), with two inclined flats (27) offset by 90° relative to the flats (23') and coacting with chamfers (28) of the same inclination provided on the corresponding surface of the corresponding slide (3) at the periphery of an oblong hole (29) for passage of the screw (21).

13. Boring head according to claim 4, wherein the nut (24) is provided with a conical periphery (24') coacting with the bottom of the counterbore (25) and comprises, below said conical periphery (24') diametrically opposed flats (30) adapted to coact with the surfaces (31') of a passage hole (31) of oblong section, whose length slightly exceeds the diameter of the nut (24) below the conical periphery (24').

14. Boring head according to claim 13, wherein the nut (24) is provided, at its end opposite the conical periphery (24'), with two inclined flats (32) offset by 90° relative to the flats (30) and coacting with chamfers (28) of the same inclination provided on the corresponding surface of the corresponding slide (3) at the periphery of an oblong hole (29) for passage of the screw (21).

15. Boring head according to claim 12, wherein the oblong hole (29) of the slides (3) has a width greater than the diameter of the screw (21), so as to permit clearance of the slides (3) relative to the screw (21), along the longitudinal axis of the body (1).

16. Boring head according to claim 4, wherein the counterbores (22 and 25) for reception of the screw head (21') and of the nut (24) have a chamfer with a rounded bottom adapted to coact with the corresponding conical peripheries of the screw head (21' and 24) of the nut (24).

* * * * *